Dec. 23, 1941.  F. A. PARSONS  2,266,901
COOKING UTENSIL
Filed Nov. 3, 1938

INVENTOR.
Fred G. Parsons

Patented Dec. 23, 1941

2,266,901

UNITED STATES PATENT OFFICE 2,266,901

COOKING UTENSIL

Fred A. Parsons, Milwaukee, Wis.

Application November 3, 1938, Serial No. 238,503

6 Claims. (Cl. 219—35)

This invention relates to cooking devices, and more particularly where electrically heated.

A well known type of cooking device, generally known to the trade as electric roasters or electric cookers, provides a main food container which is upwardly open, for insertion of food materials, being closed during cooking operations by a removable cover. These roasters or cookers are used for baking, both for meats and pastries, and also for cooking of vegetables, often simultaneously with meat. It is common practice to cook both roast meats and vegetables with little or no added water, and this type of cooking, as well as the baking of cakes and pastry and various other operations requires that the bottom of the container should be evenly heated and should not be substantially hotter than the air within the container, which also should be of uniform heat.

The conditions mentioned are difficult to obtain where, as in the type of cookers mentioned, the heat is normally applied only through the sides and bottom of the container, and particularly where the container is relatively shallow or horizontally elongated as, for example, in an oval form, or in the rectangular form shown herein. In present types of such devices, so far as I am aware, the necessary heat conditions, such as described, are obtained only at the expense of relatively slow or inefficient heating or both. Slow heating provides time for the heat to equalize in the container walls, and in the interior, but the delay is very objectionable during pre-heating of the utensil to an initial high temperature such as is required, for example, where roasts must be initially evenly seared on all outer surfaces before proceeding with the roasting, to improve the flavor and to retain the juices.

It is a purpose of the invention to provide an improved electrically heated cooking device in which the bottom wall of the food container and the air within the container can be heated to a relatively high temperature which is substantially equal in the bottom wall and container air, in a minimum time and with a minimum of current, and particularly for an open top container of a length greater than its width; and to provide a device in which a desired similarly uniform temperature may be maintained for protracted cooking operations with a minimum of current.

A further purpose is to provide a cooking device of a specific type, namely, a cooker of the type in which the food receiving opening is at the top of the container, and in which the container is longer than it is wide, as for example, rectangular or elliptical in horizontal outline, and of improved results, particularly in one or more of the matters previously referred to, and especially for electrically heated devices.

A further purpose is generally to simplify and improve the construction and operation of cooking devices, especially in one or more of the matters previously mentioned, and particularly for electrically heated devices.

The invention comprises the construction and combination of parts as herein illustrated, described and claimed and such modification of the structure illustrated and described as may be equivalent to the structures of the claims.

Throughout the specification the same reference characters have been used for the same parts, and in the drawing.

Figure 1:
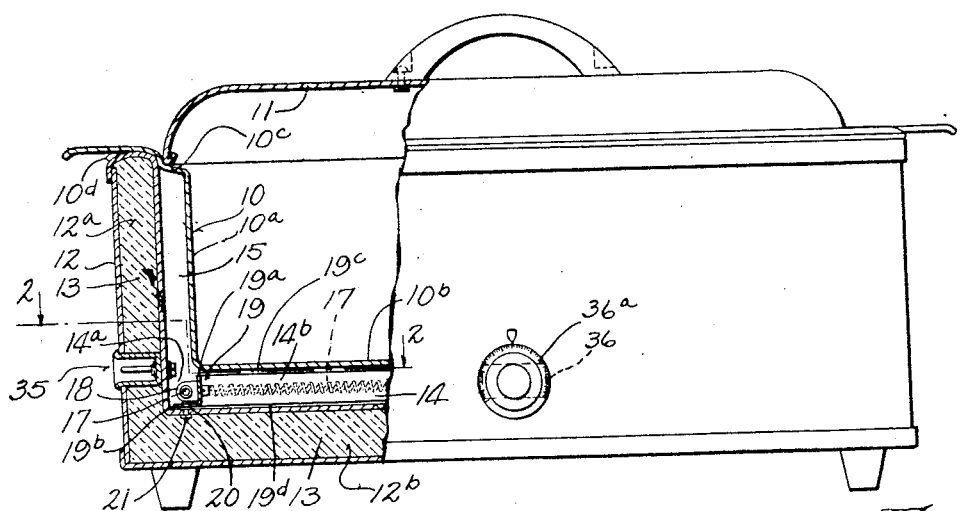
Figure 1 shows a cooking utensil incorporating the invention in one of its forms and partly in vertical section taken approximately along the line 1—1 of Fig. 2.
Figure 2:
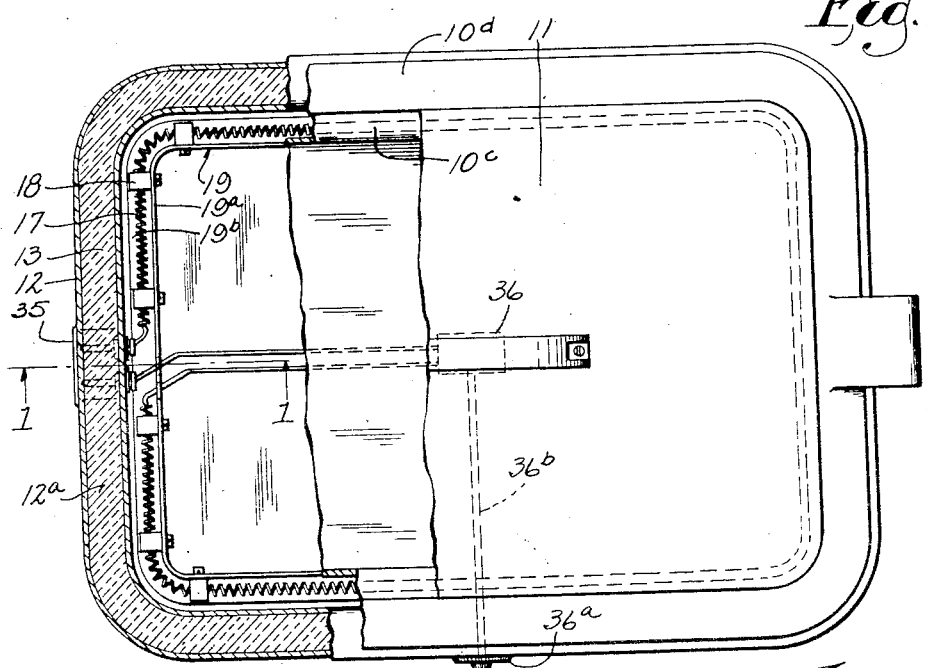
Figure 2 shows a top view of the same utensil, partly broken away and partly in horizontal section taken approximately along the line 2—2 of Fig. 1.
Figures 3, 4:
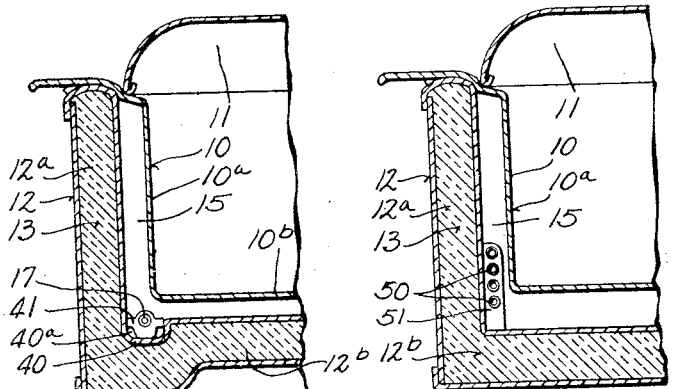
Figures 3 and 4 are partial vertical sections of a modified form of the invention.

The utensil of the form shown in Figs. 1, 2, and also in the modified forms shown in Figs. 3 and 4, has similiar food container, cover and frame parts, which will therefore be described in detail only for the utensil of Figs. 1, 2.

In the device of Figs. 1, 2 a main food container 10 is relatively shallow and of horizontal form materially longer than its width. The container is upwardly open and has vertical side walls 10a and a horizontal bottom wall 10b. The container side walls are flanged outwardly at the top as at 10c in a form to provide an inner ledge to receive and locate an upwardly removable cover 11, the flange being further outwardly extended as at 10d to rest on the top of side walls 12a of an upwardly open support or frame 12, which has a bottom wall 12b. Both the side and bottom walls of the frame 12 are constructed of spaced sheet material forming hollow wall spaces within which heat insulating material of any suitable type, such as glass wool or the like, is packed as indicated at 13, 13. The top flange portions 10d fit the side walls 12a to space the container side walls 10a at predetermined distances inside the side walls 12a, the spacing being substantially equal at all points around the lateral periphery of the container. The flange portions 10d also support the container 10 for the bottom wall 10b to be spaced at a predetermined distance above the bottom wall 12b, the vertical spacing being substantially uniform over the area of the bottom wall 10b. The support or frame thus provides an upwardly open well in which the spacing and positioning of the container 10 as described provides a relatively shallow bottom chamber 14 underneath the container bottom wall 10b and above the bottom wall 12b of the outer shell, and a vertical chamber 15 of substantial width relative to its height and extended about the periphery of the container 10, the chamber 15 being substantially closed at the top by the flange 10c and communicating at the bottom into the bottom chamber 14 at substantially all points about the periphery of the bottom chamber.

In the structure of Figs. 1, 2 the heating element is a helical resistance coil 17 supported inside the upwardly open well of the support or frame 12 on insulators such as 18, which are carried on a frame 19 having a vertical member 19a fixed with a horizontal bottom member 19b that is spaced above the bottom wall of the well by washers, such as 20, and retained by bolts or screws such as 21. Element 17 is preferably of such characteristics that when the operating current is connected the coil quickly attains a high heat, suitable for radiation of considerable quantities of radiant heat energy.

The partition member 19a separates a portion of the lower chamber 14 into a peripheral portion 14a and an inner portion 14b, the peripheral portion operating as a downward continuation of the vertical chamber 15, and a considerable portion of radiation from the heating element either directly radiated, or directly reflected by the walls of chamber 15 or of its downward continuation 14a, is received by the container side walls 10a.

The partition member 19a operates at high heat which, though relatively much lower than the heating element itself, is sufficient for a certain amount of radiant heat to be directed from the inner surface of the partition member either directly to the bottom wall 10b or to the bottom wall by reflection from the upper surface of the bottom wall 12b of frame 12.

To increase the thermal efficiency of the device and particularly with respect to obtaining maximum efficiency in directing the radiant heat inwardly to heat the container walls, the interior surfaces of the side and bottom walls 12a, 12b of the support or frame 12 are of a material and finish to operate as efficient reflectors. To effect this result the surfaces may be of chrome plate, for example, or any bright, preferably metallic, surface which will withstand the heat. Such reflector surfaces are particularly desirable and effective for the reflection of radiant energy within the vertical chamber 15 and the supplemental chamber 14a. The outer surface of the container 10, on the other hand, is of a material and finish to relatively readily absorb radiant energy, particularly as to the exterior surface of the side walls thereof, whereby to be readily heated as stated.

In addition to the radiant heat directly or indirectly received by the container side and bottom walls, as described, these walls are heated by the circulation of heated air. The air in the combined vertical chambers 15, 14a, within which the heating element 17 is exposed, is heated to relatively high temperature by direct contact with the heating element and rises directly into the vertical chamber 15, thus creating a continuous upward circulation of relatively hot air to heat the side walls 10a. In the inner portion 14b of the lower chamber 14, interiorly of the vertical partition member 19a, the air is heated by contact with the inner surface of the vertical partition 19a and continuously rises to heat the bottom wall 10b, but this air is of materially lower temperature and total heat than that which rises to heat the side walls 10a.

The inner bottom chamber 14b communicates with the chambers 15, 14a both through a top opening or channel 19c and a bottom opening or channel 19d, both the openings extending substantially about the periphery of chamber 14b. These openings provide for a restricted amount of interchange and circulation of air, limited to permit the air in the chambers 15, 14a to circulate at a relatively higher heat than the air in the inner lower chamber 14b, as long as the heating element is operating, but assisting equalization and levelling of heat in the chambers when the current is off.

The form and position of the partition members 19a, 19b are such as to substantially prevent both direct radiation and direct conduction of heat from the element 17 to the bottom wall 12b of the support or frame, and thereby to add materially to the thermal efficiency of the cooking utensil.

With the construction described the container 10 and its contents may be very quickly raised to relatively very high heat, and during any period of heat increase the temperature of the side walls 10a is continuously materially higher than the temperature of the bottom wall 10b, while the air within the container is of substantially the same temperature as the bottom wall, which is the desired heat ratio as previously pointed out. The relatively high temperature of the side walls, particularly the upper portions of the walls, is of no detriment and materially assists in reducing the heating time required, especially for pre-heating the utensil to relatively high temperatures.

When the current is cut off, after reaching a desired heat, the temperature of the side and bottom walls is rapidly equalized throughout at substantially the same temperature as the air within the container, the equalizing being materially assisted by air movement between the several chambers. It is to be noted, however, that, even during the equalizing, the hottest air tends to rise to the upper level of chamber 15, thereby maintaining the upper portions of side walls 10a at diminishingly higher temperature than the bottom wall 10b until equalizing is completed.

For convenience in pre-determining and maintaining desired temperatures the heating element is connected to a plug-in connector such as 35, Figs. 1, 2, serially through a temperature controlled switch device such as 36. The connection of the element 17 of the structure of Figs. 1, 2 is illustrative. The temperature control device 36 may be of any suitable well known construction such that at various temperatures of the container 10, as predetermined by the manual adjustment of an indicator means 36a operating through a shaft 36b, the circuit through coil 17 will be interrupted, but will be closed again as soon as the temperature of container 10 falls materially below that indicated by indicator 36a. In such mode of operation of the cooking device a high thermal efficiency is of special significance. The higher the efficiency the longer the relative time during which the current is interrupted and during which equalization of temperature in the walls and contents of the container may proceed. Such control of the present device, by reason of the high thermal efficiency, results in substantially uniform temperatures being continuously maintained throughout the container, even at high heat.

The modified structure of Fig. 3 is the same in purpose and substantially the same in mode of operation and effect as the structure of Figs. 1, 2. The support and container is the same as that of Figs. 1, 2 except that there is provided a depression or groove 40 formed in the lower support wall 12b, to effect a peripheral chamber portion 40a operating in the manner of the peripheral chamber portion 14a of the other structure. The heating element 17 is supported at suitable intervals by insulators 41.

The modified structure of Fig. 4 is also the same in purpose and substantially the same in effect as the structure of Figs. 1, 2. In this instance both the container and the support are substantially like those of the other structure. The heating element 50 is arranged in vertically spaced peripheral loops, supported at suitable intervals by insulators 51. In this instance the side wall 10a by reason of the form and position of the heating element receives somewhat more of direct radiation than in the other structures.

In both the modified structures of Figs. 3, 4 the manner of heating the bottom plate differs somewhat from that of the structures of Figs. 1, 2 but the structures are such that the desired temperature ratios are maintained together with quick heating of the container, and the heat is rapidly equalized when the current is off.

What is claimed is:

1. A cooking utensil including an upwardly open food container having a bottom wall, and a support therefor, together defining an upwardly and laterally closed vertical chamber peripherally substantially surrounding said container and a laterally and downwardly closed lower chamber underneath said bottom wall and communicating with said vertical chamber, and electrically heated means concentrated and exposed at a lower level of said chambers and of a form and position effecting movement of air heated by said means substantially directly upwardly into said vertical chamber, said heated means being formed and extended to effect said upward air movement substantially equally peripherally about said container, and said vertical chamber being of sufficient lateral width substantially throughout its peripheral extension for simultaneous downward movement of relatively cool air, whereby to effect a continuous and relatively rapid air circulation upwardly and downwardly and substantially limited to within said vertical chamber and extending about said container.

2. A cooking utensil including an upwardly open container of non-circular horizontal outline having a length materially greater than its width, said container having side walls and horizontal bottom wall, a support for said container providing walls forming together with the walls of the container an upwardly and laterally closed vertical chamber peripherally substantially laterally surounding the container and a downwardly and laterally closed lower chamber underneath the container bottom wall and communicating with said vertical chamber, and electrically heated means concentrated and exposed at a lower level of said chambers and of a form and position effecting movement of air heated by said means substantially directly upwardly into said vertical chamber, said heated means being formed and extended to effect said upward air movement substantially equally peripherally about said chamber irrespective of the non-circular and elongated form of said container, and said vertical chamber being of sufficient lateral dimension substantially throughout its peripheral extension for simultaneous downward movement of relatively cool air, whereby to effect a continuous and relatively rapid air circulation upwardly and downwardly and substantially limited to within said vertical chamber and extending substantially uniformly peripherally about said container.

3. A cooking utensil as recited in claim 1 in which the inner and outer peripheral walls defining said vertical chamber are respectively portions of said container and of said support, and the major part of the interior surface of said inner and outer peripheral walls are respectively relatively absorbent and relatively highly reflective of radiant heat energy received thereon from said heated means.

4. A cooking utensil as recited in claim 2 in which the inner and outer peripheral walls defining said vertical chamber are respectively portions of said container and of said support, and the major part of the interior surface of said inner and outer peripheral walls are respectively relatively absorbent and relatively highly reflective of radiant heat energy received thereon from said heated means.

5. A cooking utensil as recited in claim 2 including shielding means within said lower chamber and interposed between said heated means and container bottom wall for materially reducing direct radiation of heat energy from said heated means to the major portion of said bottom wall while permitting a certain amount of air circulation movement between said vertical and bottom chambers.

6. A cooking utensil as recited in claim 2 including means substantially reducing direct radiation of radiant heat energy from said heated means to some of the portions of the bottom wall of said inner container located adjacent bottom wall peripheral portions relatively remote from the geometrical center of the bottom wall periphery.

FRED A. PARSONS.